United States Patent [19]

Nyssen et al.

[11] Patent Number: 5,260,003
[45] Date of Patent: Nov. 9, 1993

[54] METHOD AND DEVICE FOR MANUFACTURING ULTRAFINE FIBRES FROM THERMOPLASTIC POLYMERS

[76] Inventors: Peter R. Nyssen; Armin Kreimer; Wolfram Wagner; Dirk Berkenhaus, all of Magnolienstrasse 6, D-4047 Dormagen 11, Fed. Rep. of Germany

[21] Appl. No.: 910,344
[22] PCT Filed: Nov. 15, 1991
[86] PCT No.: PCT/EP91/02152
§ 371 Date: Jul. 22, 1992
§ 102(e) Date: Jul. 22, 1992
[87] PCT Pub. No.: WO92/10599
PCT Pub. Date: Jun. 25, 1992

[30] Foreign Application Priority Data

Dec. 15, 1990 [DE] Fed. Rep. of Germany ....... 4040242
Nov. 15, 1991 [WO] World Int. Prop. O. ........... PCT/EP91/02152

[51] Int. Cl.[5] .................................. B29B 9/10
[52] U.S. Cl. .......................... 264/6; 156/167; 264/12; 264/518; 264/115; 425/7
[58] Field of Search ............... 264/6, 12, 518, 115; 425/7; 156/167

[56] References Cited

U.S. PATENT DOCUMENTS

| | | | |
|---|---|---|---|
| 3,806,289 | 4/1974 | Schwarz | 264/115 |
| 4,001,357 | 1/1977 | Walz et al. | 264/12 |
| 4,919,854 | 4/1990 | Walz | 264/12 |
| 5,080,569 | 1/1992 | Gubernick et al. | 425/7 |

FOREIGN PATENT DOCUMENTS 1785158 8/1968 Fed. Rep. of Germany.
2237884 8/1972 Fed. Rep. of Germany.

*Primary Examiner*—Mary Lynn Theisen
*Attorney, Agent, or Firm*—Sprung Horn Kramer & Woods

[57] ABSTRACT

A process and device for manufacturing ultrafine fibers and ultrafine-fibre mats from thermoplastic polymers with mean fibre diameters of 0,2-15 μm, preferably 0,5-10 μm, by a melt blowing technique. The polymer melt (12) flows through at least one bore (15) in a melt blowing nozzle (18). Immediately on emerging from the bore, gas is blown against the extrusion from both sides of the bore exit (15), thus breaking up the melt to form fibers. To this end, the gas is accelerated to supersonic speed in Laval nozzles (25, 26; 31, 32), disposed in mirror symmetry round the bore exits (15), and decelerated to just below the speed of sound in channels (27) with constant cross-section, or a cross-section which decreases in the direction of flow, fitted downstream of the Laval nozzles, and the melt (12) fed into the gas stream emerging from the channels (27).

11 Claims, 4 Drawing Sheets

METHOD AND DEVICE FOR MANUFACTURING ULTRAFINE FIBRES FROM THERMOPLASTIC POLYMERS

BACKGROUND OF THE INVENTION

The invention is based on a process for producing microfibres and non-woven microfibre webs from thermoplastic polymers by the melt-blowing technique in which a polymer melt flows through at least one orifice in a melt die and is separated into fibers by a gas which impinges on the melt from both sides immediately after its exit from the orifices. The invention also relates to a device for carrying out the process. The melt-blowing process has been disclosed in numerous publications (see e.g. U.S. Pat. Nos. 3,755,527, 3,978,185, 4,622,259 and 3,341,590), and German Patent No. 2,948,821. According to the melt-blowing technique a stream of polymer melt extrusion issuing from a melt orifice is separated into individual fibers and drawn out while attenuated by means of an inert gas, in most cases air, which has a temperature higher than or equal to the temperature of the melt and is blown against the melt in the direction of flow. One main object is to increase the economic efficiency of the process by appropriately regulating the melt viscosity. Thus the prior art discloses the use of polymers with an extremely low viscosity and correspondingly high extrusion flow rates, since this enables relatively fine fibers to be produced with a lower degree of energy consumption by reducing the temperature of the melt and the gas stream. The following parameters are known to have a crucial effect on the economic efficiency of the process:

a) The number of melt orifices (per unit of length) and the throughput of the melt per orifice,
b) the melt temperature and viscosity of the melt,
c) the gas inlet pressure for obtaining a uniform gas stream with high flow rate over the whole length of the die,
d) the temperature of the gas stream, and
e) the mass flow rate of the gas.

According to the prior art the gas temperature is adjusted to a value higher than or equal to the temperature of the melt. In all known processes the gas stream issues from the die in direct proximity to the melt orifices and on either side thereof via exit slots arranged in the longitudinal direction of the die. Complicated hydrodynamic brake means and air distributing systems have to be provided in the gas inlets to ensure a uniform rate of flow over the entire slot length. PCT application WO 87/04195 describes appropriate technical means for achieving optimum results.

The use of relatively large gas exit slots (1 mm to 3 mm) has also been disclosed. One disadvantage of this method is the high quantity of gas required since high rates of flow are necessary in particular for the production of very fine fibers of an average diameter of $<3$ $\mu$m. The rate of flow at the slot exit is usually 0.5 to 0.7 times the sonic speed of the gas (0.5 $V_s$ to 0.7 $V_s$; $V_s$=sonic speed).

SUMMARY OF THE INVENTION

A principle object of the invention is to provide an additional increase in the economic efficiency of the melt-blowing process. In particular the object is to provide higher economic efficiency in the production of fibers of mean fibre diameters of $<10$ $\mu$m, preferably $<5$ $\mu$m. An additional object is to considerably increase the melt throughput per orifice and thus the total spinning capacity of the installation when producing fibers of mean diameters of between 0.5 $\mu$m and 3 $\mu$m.

According to the invention the above objects are achieved by accelerating the rate of flow of the gas to supersonic speed in Laval nozzles arranged mirror-symmetrically in relation to the melt orifices and reducing the rate of flow of the gas in flow channels arranged downstream of the Laval nozzles, and having a constant cross-section or a cross-section tapering in the direction of flow to a rate just below sonic speed and by directing the polymer melt into the gas stream issuing from the flow channels. "Just below sonic speed" is understood to be a range between 0.8 $V_s$, preferably 0.9 $V_s$ and 0.99 $V_s$ (0.8 $V_s<V<0.99$ $V_s$, preferably 0.9 $V_s<V<0.99$ $V_s$). Whereas in the known melt-blowing process the rate of flow of the gas stream at the exit to the slot nozzles is considerably lower than sonic speed, the solution provided by the invention is based on a gas exit speed just below sonic speed ("transonic speed") which is obtained in a particular manner. This solution is effected technically with the aid of Laval nozzles which are oriented in the direction of the gas stream adjacent to the tip of the melt die and are arranged at a small distance upstream of the melt orifices. Thus the device for carrying out the process is characterised according to the invention in that the gas nozzles are designed in the form of Laval nozzles with flow channels arranged downstream thereof and having a convergent or constant cross-section, which are arranged in direct proximity to the wedge-shaped die tip and terminate with a sharp edge maximally 3 mm above or below the level of the melt orifices.

The Laval nozzles can either have a square or a circular cross-section with an orifice diameter of 0.3 to 2 mm.

Preferably widened sections leading into the flow channel are arranged downstream of the Laval nozzles. The inlet cross-section of the flow channel should be 1 to 2.5 times the sum of the widened cross-sections of the Laval nozzles and the length of the flow channels should be 1 to 30 times the widened cross-section.

According to a further embodiment a gas smoothing chamber (tranquilizing chamber) is arranged upstream of the Laval nozzles and several linearly arranged Laval nozzles are assembled together with the corresponding gas smoothing chambers in the form of individual units to form a modular gas supply element.

The gas supply elements, whose width is 25 mm to 500 mm and preferably 50 mm to 200 mm are advantageously connected in a gas-tight manner both to the melt die and to each other. In a further advantageously designed modification the gas supply elements can be displaced parallel to the wedge-shaped contour of the melt die tip in order to allow the adjustment of the distance between the Laval nozzles and the melt orifices.

Compared to the previously known melt-blowing processes a considerably higher space time yield (production rate) is achieved under stable and uniform operating conditions. Of considerable importance is the reduction in the rate of flow of the gas streams which issue from the Laval nozzles at supersonic speed, in the flow channels arranged downstream of the Laval nozzles. The flow channels are constructed in such a manner that one side of each flow channel is formed by the outer wall of the melt die tip. The Laval nozzles and the flow channels can be displaced parallel to the outer walls of the wedge-shaped melt die so as to allow the use of either position typically employed in the melt-blowing technique, i.e. either the stick out or the set back position. The following advantages are obtained by the invention:

1. Due to the presence of the particularly uniform transonic region of flow in the vicinity of the melt orifices the draw rate of the melt from the orifices and thus also the yield, is greatly increased without trading off between product quality and yield.

2. It has been found that it is possible to considerably increase the melt throughput per hole for fibre thicknesses of less than 5 $\mu$m and in particular less than 3 $\mu$m.

3. It has also been found that, compared with the conventional process for the production of fibers of the same fineness, considerably lower gas throughput quantities are required for identical melt throughput quantities.

4. Static pressures in the gas smoothing chamber of less than 4 bar (abs.), and preferably less than 2.5 bar (abs.) are sufficient for obtaining a transonic region of flow.

5. In the Laval nozzles the gas is distributed over the length of the die in an absolutely uniform manner, so that additional means for ensuring uniformity which are necessarily associated with a loss in pressure can be dispensed with.

6. Compared to the conventional melt-blowing process the specific energy consumption can be reduced by a factor of 2 for an identical fibre fineness in the range $d < = 5$ $\mu$m, preferably $< = 3$ $\mu$m.

7. Due to the reduced quantity of gas required the fibers can be deposited more uniformly and without any secondary entangling on to the fibre-collecting belt, especially in the case of very fine fibers. Also flying fibers are avoided in the production of very fine fibers ($<2$ $\mu$m) and low web densities.

8. Due to the increased rate of attenuation in the transonic region of flow the gas temperature can be considerably decreased in comparison with the conventional process for producing identical fibre thicknesses. As a result of the reduced quantity of gas there is also less compression of the web material as it is deposited on to the fibre-collecting belt; i.e. a web with reduced density is produced without adhesion of the fibers.

9. Due to the absolutely uniform distribution of gas over the width of the die disadvantageous edge zone effects can be avoided.

10. The process has proven particularly effective for the production of fibre webs with fibre finenesses of less than 3 $\mu$m, and in particular less than 2 $\mu$m.

11. The fibre webs produced by the process have excellent filtration properties as a result of their reduced density and homogeneous structure. Compared to prior art the following superior results of such filter webs are predominant:
   a. higher particle filtration efficiency at a reduced flow resistance
   b. a higher dust collecting capacity,
   c. higher electrostatic charge accumulating capacity, for example if an electric corona discharge technique is used for charging the web.

In the following, working examples of the invention are explained in more detail with reference to the drawings.

DESCRIPTION OF THE PREFERRED EMBODIMENTS

Sheet fibre products, in particular fleece materials or fibre webs, manufactured by the melt-blowing process are of great economic importance in present-day technology. They are used for many applications and in particular in cases where very fine fibres are required in conjunction with high surface coverage. Virtually all melt-extrudable thermoplastic polymers can be used as starting materials. Possible applications are for example: Filtration media, hygienic filters, medical applications, protective clothing, absorbent media, battery separating media, insulating clothing etc. Materials combined with other textiles or non-woven webs are also known. It is thus highly important to improve the economic efficiency of the melt-blowing process. An increase in the melt throughput rate and/or a reduction in the specific air consumption is a necessary requirement for achieving an improvement in economic efficiency. It goes without saying that product quality must not in any way suffer as a result of such improvements; i.e. product quality must at least remain constant. For the production of filtration media with a high degree of filtration efficiency and low flow resistance microfibre media are required having a lower density at identical or higher fibre fineness than that disclosed in the prior art. It is also advantageous to be able to produce the sheet fibre products at lower gas and melt temperatures than those employed in the prior art. This permits a reduction in the tendency of the fibres to adhere to each other on being deposited on the fibre collecting belt and simultaneously decreases the tendency of temperature-sensitive polymers to undergo thermal decomposition during the extrusion and spinning process and at the same time increases the lifetime of the spinning nozzles. In order to obtain uniform and homogeneous product quality over the entire width of the web an absolutely uniform and constant distribution of air with regard to space and time is required.

Figure 1:
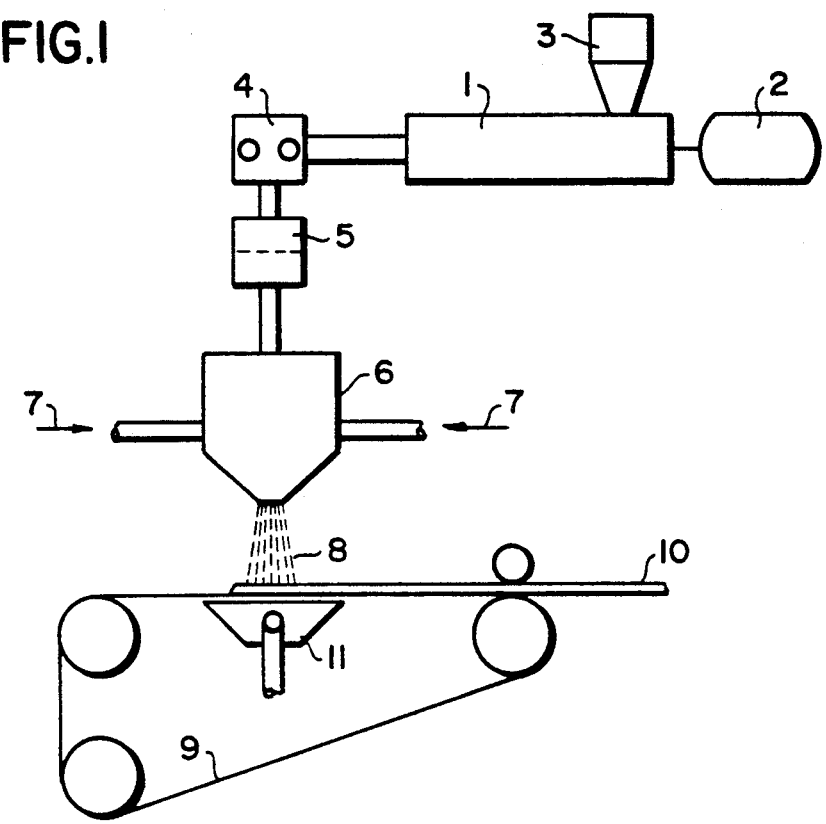
FIG. 1 shows schematically the layout of a complete melt-blowing installation
Figure 2:
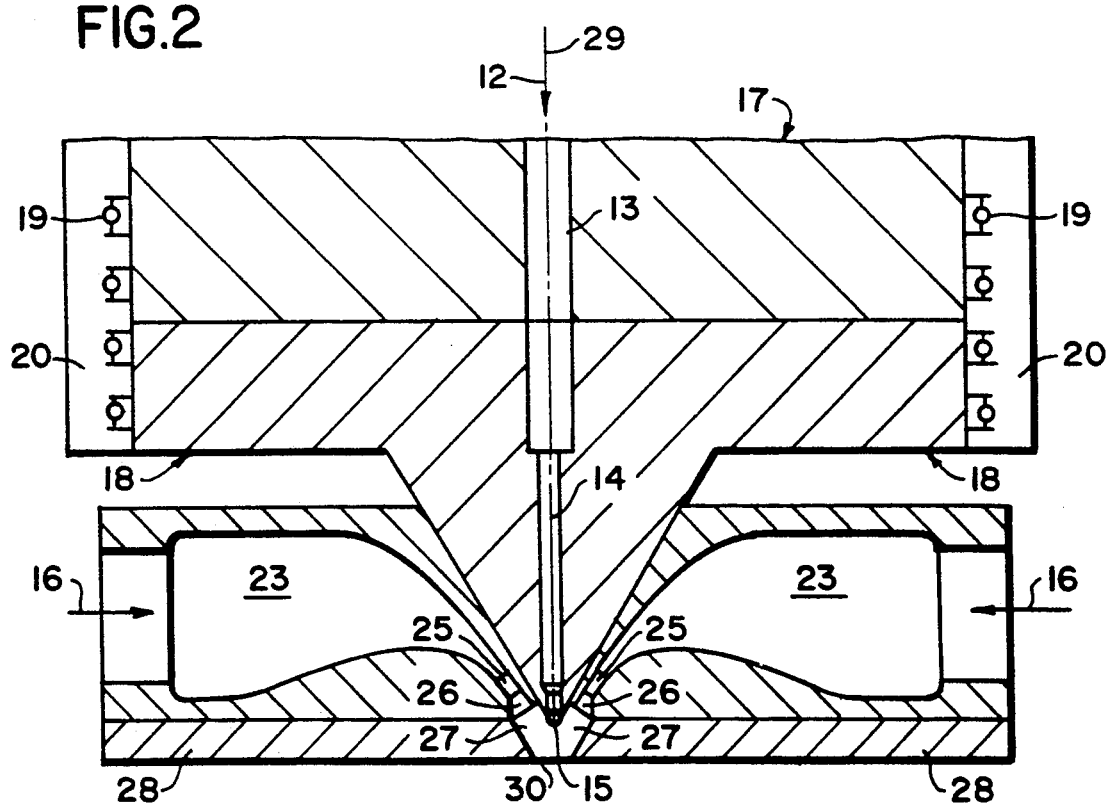
FIG. 2 shows an embodiment of the melt-blowing die according to the invention, including the gas supply elements (lateral view)

The production of a fibre web by the melt-blowing process is first described generally (i.e. according to the prior art) with reference to FIG. 1. The extruder 1 driven by a motor 2 is fed with a polymer via funnel 3. The polymer melt is delivered to the melt-blowing die 6 via melt filter 5 by means of a spinning pump 4. The extruder, the spinning pump, the melt filter, the die and the transition zones are heated in order to obtain the required temperature and viscosity of the melt. The melt-blowing nozzle 6 has inlets for the fibre-forming gas 7 which is supplied by means of a compressor and is heated to the required temperature by means of a heat exchanger (not depicted) before it enters the melt-blowing die 6. The melt-blowing die 6 has at least one linear row of fine orifices from which the melt issues by means of an inlet pressure produced by the spinning pump 4 and is attenuated by means of gas 7 to form microfibres which are deposited on a mechanically driven fibre-collecting belt 9 to form the finished web 10. A portion of the gas stream is removed by means of a suction box 11 arranged beneath the fibre-collecting belt 9. FIG. 2 shows a cross-section through the embodiment of the melt-blowing die on which the invention is based. The polymer melt 12 flows into slot 14 via melt distributor 13 and then into the orifices 15 from which it issues while being attenuated into microfibres by means of a gas 16 (air) supplied from both sides at a high rate of flow. The melt distributor 13 is arranged inside a die block 17, below which the melt-blowing die 18 is arranged in a melt-tight manner. The die block 17 and the melt-blowing die 18 are heated by means of electric resistance wires 19 arranged within the surrounding heating jacket 20. The wedge-shaped die tip 21 of the melt-blowing die 18 has an angle of 20° to 100°, preferably 40° to 80°. The melt exit holes 15 are arranged linearly (perpendicularly to the drawing plane) and have a diameter of 0.1 to 0.6 mm, preferably 0.1 to 0.4 mm, and a channel length 2 to 10 times their diameter.

The fibre-forming gas 16 is fed from both sides via openings 22 into gas smoothing chambers 23 arranged inside the gas supply elements 24. The smoothing chambers 23 lead into very small, linearly arranged gas openings 25, which are located in direct proximity to the die tip 21 and oriented in a direction parallel to the wedge-shaped contour of the die tip 21. The gas openings 25 are provided with widened sections 26 and represent fluidically (with regard to the flow configuration) widened Laval nozzles (25, 26). A flow channel 27 is arranged downstream of each of the widened sections 26 which is defined on the one side by the contour of the melt die tip 21 and on the other side by the bottom plates 28, the bottom plates 28 terminating with a sharp edge in the region of the apex of the die tip 21. The gas supply elements 24 together with the smoothing chambers 23 and the Laval nozzles 25, 26 are arranged on either side of the melt orifices 15 or die axis 29 and mirror-symmetrically in relation thereto.

Figure 3:
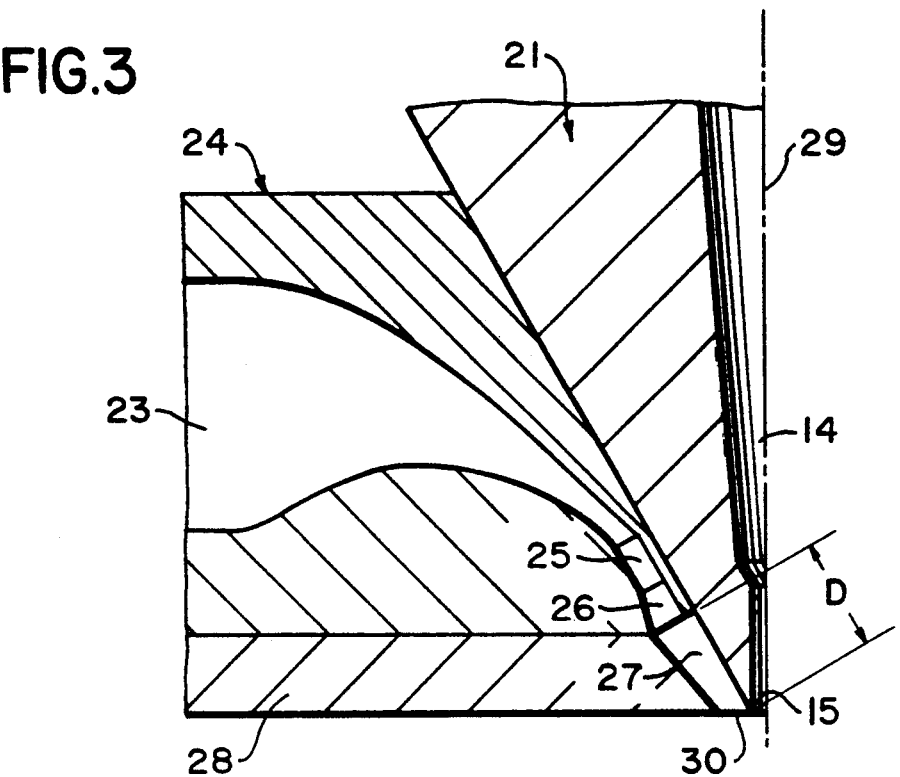
FIG. 3 shows a magnified section of the melt-blowing die with circular Laval nozzles

The gas supply elements 24 are arranged adjacently to the contour of the wedge-shaped die tip 21 in a gas-tight manner and can be displaced in a parallel direction to the wedge-shaped surfaces. It is thus possible to adjust the distance between the Laval nozzles 25, 26 and the melt orifices 15. Depending on the polymer specifications and the required physical web properties it is therefore possible to displace the outlet of the melt orifices 15 in relation to the sharp-edged outlet of the issuing gas jets to the required extent upwards or downwards in the direction of flow. The bottom plates 28 can also be displaced transversely to the die axis 29, thus allowing the flow slot 30 or the flow channels 27 to be accurately adjusted. The gas openings 25 of the Laval nozzles have a diameter of 0.3 to 2.0 mm, preferably 0.4 mm to 1 mm, and a length 0.3 to 5 times the diameter. The widened section 26 beneath the gas openings 25 has a total angle of 5° to 30°, preferably 10° to 20°. The widened section 26 is conically shaped, and is either axially symmetrical to the axis of the gas opening 25 or is inclined at an angle in relation thereto (as shown in FIG. 3). The latter embodiment has the advantage that the Laval nozzles 25, 26 can be arranged in direct proximity to the die tip 21. The cross-section of the flow channels 27 downstream of the Laval nozzles converges or remains constant in the direction of flow. The length of the flow channels 27 is 1 to 30, preferably 3 to 20 times the largest diameter of the widened sections 26 of the Laval nozzles. The main purpose of the flow channels is to form a homogeneous region of transonic flow in the longitudinal direction of the flow channels 27.

With the aid of the Laval nozzles 25, 26 and by establishing a pressure ratio between the flow channel 27 and the gas smoothing chamber 23 which corresponds at least to the critical Laval pressure ratio of 0.53, a rate of flow is formed in the Laval orifice 25, as a result of the known flow parameters, which corresponds to sonic speed at the given temperature. This parameter applies to all Laval nozzles 25 so that throughout the length of the melt-blowing die 18 (perpendicularly to the plane of projection) an absolutely uniform stream of gas issues from the flow slot 30. Inlet pressures in the gas smoothing chambers 23 of 1.9 to 5 bar (abs.), preferably 1.9 to 2.5 bar (abs.) are sufficient for obtaining such flow conditions. The widened section 26 of the Laval nozzles serves to accelerate the flow to supersonic speed and to improve the cross-sectional homogeneity of the gas stream as it enters flow channel 27. Due to the parallel or convergent shape in flow channel 27 the ultrasonic diffusion effect causes the rate of flow to be reduced to transonic speed with optimum cross-sectional homogeneity in the proximity of the flow slot 30. "Transonic speed" is understood to refer to a flow rate of at most 20% (at maximum), and preferably at most 10% below sonic speed. The inlet cross-section of the flow channels 27 is 1.0 to 2.5 times the sum of the cross-sections of the widened sections 26 of the Laval nozzles and the outlet cross-section is 0.8 to 2.5 times this sum. Such conditions provide a high degree of flow stability and homogeneity in the critical region of the orifices 15.

FIG. 3 shows the assembly of the gas smoothing chamber 23, the Laval nozzle 25, 26 and the flow channel 27 once again in magnified form. The wall thickness of the portion of the gas supply element 24 adjacent to the outer wall of the die tip 21 at the level of the gas openings 25 (Laval nozzles) is as small as technically possible. The sharp-edged outlet to the flow channel 27 (referred to as the flow slot 30) is flush with the melt orifice in this embodiment. The gas smoothing chamber 23 begins with a relatively large cross-section and tapers continuously towards the Laval orifices 25, thus helping to minimise flow resistance in the subsonic region. The distance a, i.e. the length of the flow channel 27, is in the range from 1 mm to 50 mm, preferably 2.5 mm to 30 mm.

Figure 4:
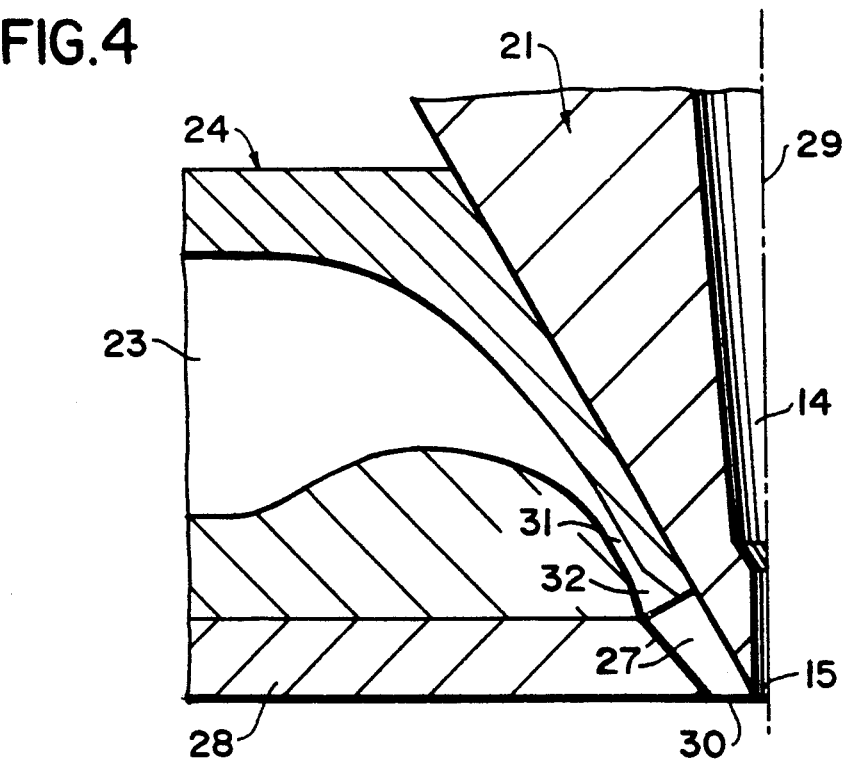
FIG. 4 shows a magnified section of the melt-blowing die with slot-shaped Laval nozzles

FIG. 4 shows an alternative slot-shaped embodiment of the Laval nozzles. Both the Laval orifice and the widened section downstream thereof are slot-shaped in this embodiment. Thus the Laval nozzle consists of Laval slot 31 and the slot-shaped widened shaft 32 downstream thereof. The slot-shaped cross-section of the Laval nozzles 31, 32 extends over the whole width of the die tip (perpendicularly to the drawing plane). The widened shaft has a total angle of 5° to 30°, preferably 10° to 15°. As in the embodiment according to FIG. 2 a flow channel 27 with a convergent or constant cross-section which terminates with slot 30, is arranged downstream of the widened shaft 32. In all of the embodiments shown in FIGS. 2 to 5 the fibre-forming gas which produces the fibres and attenuates the melt streams issuing from the melt orifices 15, is formed by gas streams directed on to the melt strands from both sides by means of flow channels 27.

Figure 5:
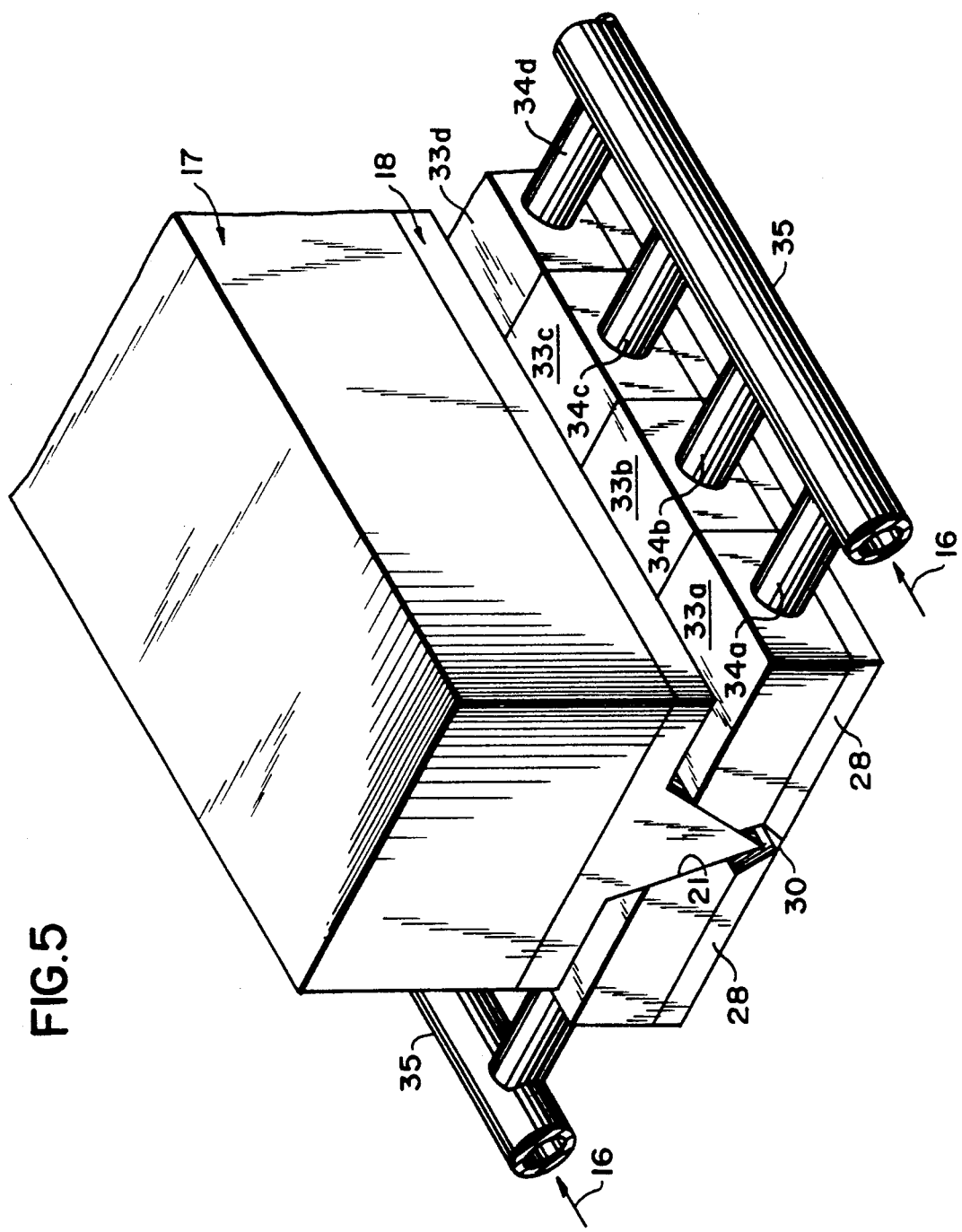
FIG. 5 is a perspective view of a melt-blowing die with air supply elements in modular form

FIG. 5 shows a particularly advantageous modular construction in which a number of air supply elements 33a, 33b, 33c, 33d . . . are arranged next to or behind one another at the side of the melt-blowing die 18 in the form of an assembly of individual units. Each unit is connected via pipe 34a, 34b . . . to a distributor pipe 35 which is supplied with the fibre-forming gas 16. Each gas supply element comprises a gas smoothing chamber 23 which supplies several Laval nozzles 25, 26 with a circular cross-section or one slot-shaped Laval nozzle 31, 32.

The gas supply elements 33a, 33b . . . are sealed at their front ends, so that they represent individually effective units which are juxtaposed to each other in a gas-tight manner. As shown in FIG. 5 and in accordance with the basic embodiment according to FIG. 2 the gas supply elements are arranged mirror-symmetrically (to the central plane of the melt-blowing die 18) on either side of the die tip 21.

The embodiment according to FIG. 5 has the following advantages especially for the production of fibre webs of large widths:

1. The gas stream in slots 30 is absolutely uniform over the whole width, even where dies of large dimensions are employed.
2. Provided the width of the individual units is not too large, misalignment of the Laval openings 25 or the Laval slot 31 during the manufacture of the Laval nozzles can be avoided. Appropriate unit widths are in the range from 25 to 500 mm, preferably 50 to 200 mm.
3. The unit assembly allows the air supply elements to be connected to the melt-blowing die 18 in the best possible manner.
4. Webs of different widths can be obtained in a simple manner.

EXAMPLE

Polypropylene produced by Exxon, Type PD 3495 having a melt flow index of 800 g/10 min was melted according to FIG. 1 and delivered to a melt-blowing die according to FIGS. 2 and 3 having the following characteristic dimensions:

Diameter of the melt orifices 15: 0.3 mm
Channel length: 3.8 mm
Lateral distance of melt orifices 15: 1.25 mm
Apex angle of the melt die tip 21: 60°
Diameter of the Laval orifice 25: 0.6 mm
Length of the Laval orifice 25: 0.3 mm
Widened section 26 of the Laval nozzle: Total angle 15°;
End diameter: 0.7 mm
Lateral distance of the gas openings 25: 0.8 mm
Flow channel 27: initial width 0.8 mm; width at exit (at the level of the sharp-edged outlet): 0.7 mm;
Length: 2.3 mm
Unit width: 50 mm
Number of units: 2 on each side.

The sharp-edged outlet of the air exit slot (flow slot) 30 was flush with the die tip 21. Air was used as the fibre-forming gas; it was compressed in a screw compressor and heated to the required temperature in an electric heater arranged downstream of the compressor. During web formation a portion of the volumetric stream of the fibre-forming gas was removed with the aid of the suction removal means 11.

Table 1 shows the results obtained in relation to fibre load, fibre diameter and specific energy consumption, the apparatus was operated with the following process parameters:

Static pressure of the air in the gas smoothing chamber 23: 3 bar (abs.),
Temperature of the air: 285° C.,
Melt temperature: 230° C.,
Inlet pressure of the melt upstream of the filter 5 (see FIG. 1): 35 bar.

With the above process parameters a sonic speed of about 440 m/s results in the Laval nozzles and a rate of flow of about 5% below sonic speed is obtained at the flow slot 30. The distance between the melt-blowing nozzle 21 and the fibre-collecting belt 9 was 0.3 m. Table 2 shows the results of a further series of tests, in which the static pressure of the air in the smoothing chambers 23 was decreased to 2.2 bar (abs.) and the gas temperature was increased to 294° C. No changes were made in the remaining operating parameters.

In the tables:

$\dot{m}_{F,B}$ is the melt mass throughput per hole, $\lambda$ is the air stream load (ratio of the mass flow rate of the fibres to the mass flow rate of the blowing air)

$1/\lambda$ is the consumption of blowing air in relation to the quantity of fibres produced $d_F$ is the mean fibre diameter $E_L/\dot{m}_F$ is the specific net energy consumption necessary for compressing and heating the blowing air, based on the quantity of fibres and at an inlet temperature of 40° C. of the air into the electric air heater.

TABLE 1

| $\dot{m}_{F,B}$ (g/min) | $\lambda$ *10$^{-3}$ (kg$_F$/kg$_L$) | $1/\lambda$ (kg$_L$/kg$_F$) | $d_F$ ($\mu$m) | $E_L/\dot{m}_F$ (kWh/kg$_F$) |
|---|---|---|---|---|
| 0,089 | 3,37 | 297 | 1,25 | 36,6 |
| 0,16 | 6 | 165,6 | 1,68 | 20,4 |
| 0,23 | 8,7 | 114,8 | 2 | 14,2 |
| 0,3 | 11,3 | 88,8 | 2,3 | 11 |
| 0,43 | 16,2 | 61,7 | 2,6 | 7,6 |
| 0,56 | 21,1 | 47,3 | 2,95 | 5,8 |
| 0,87 | 32,9 | 30,4 | 3,25 | 3,7 |

TABLE 2

| $\dot{m}_{F,B}$ (g/min) | $\lambda$ *10$^{-3}$ (kg$_F$/kg$_L$) | $1/\lambda$ (kg$_L$/kg$_F$) | $d_F$ ($\mu$m) | $E_L/\dot{m}_F$ (kWh/kg$_F$) |
|---|---|---|---|---|
| 0,086 | 4,47 | 223,8 | 1,44 | 25,1 |
| 0,15 | 7,9 | 126,6 | 1,61 | 14,2 |
| 0,23 | 12 | 83 | 1,77 | 9,3 |
| 0,3 | 15,8 | 63,3 | 2,11 | 7,1 |
| 0,43 | 22,2 | 45,1 | 2,65 | 5,1 |
| 0,57 | 29,6 | 33,8 | 3,1 | 3,8 |

In both test series it was found that very fine fibres can be obtained with very efficient energy consumption values. In the second test series considerably lower energy consumption values were obtained especially for fibre finenesses of less than 2.5 $\mu$m.

Figure 6:
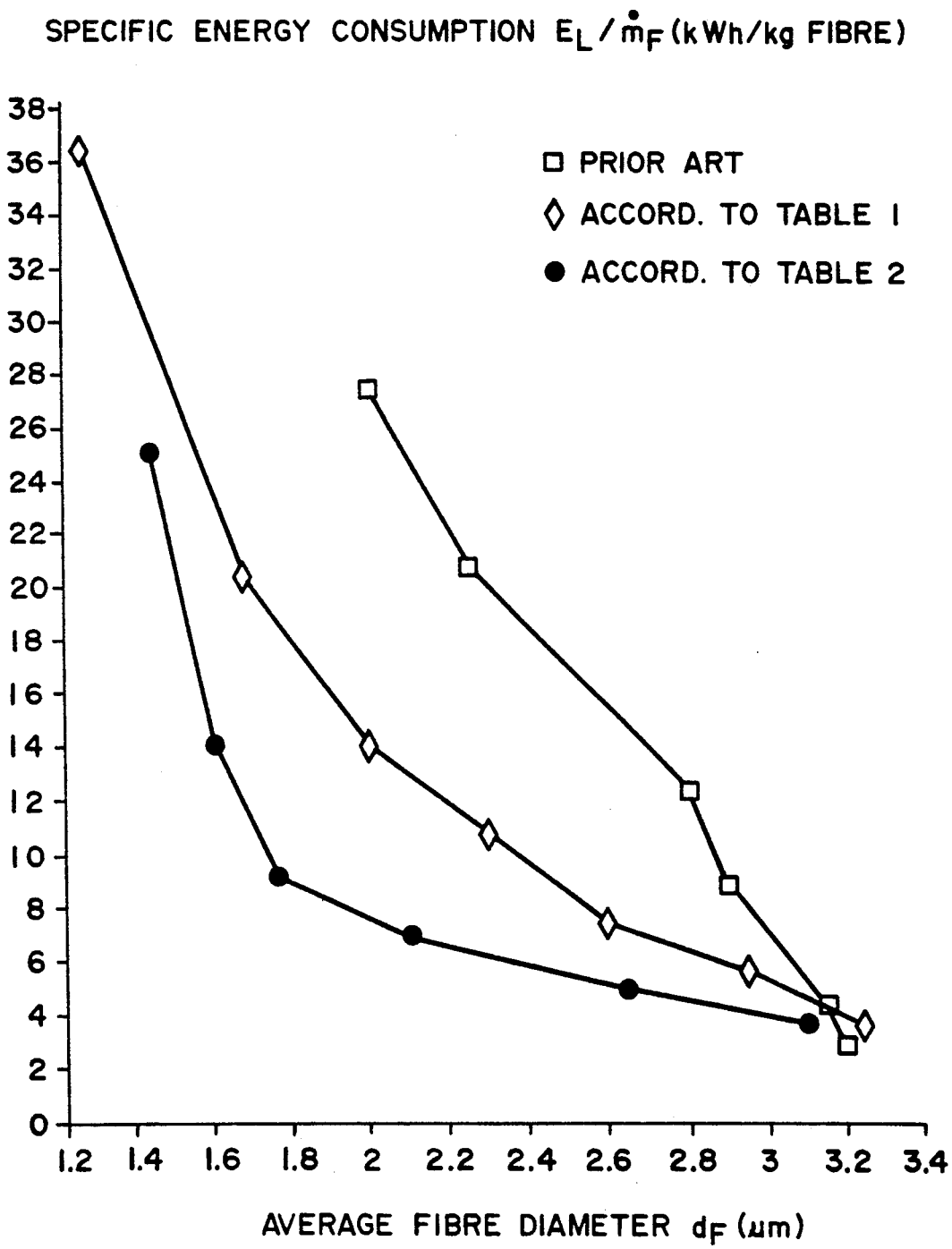
FIG. 6 shows the specific energy consumption of the process as a function of the average fibre diameter.

The graph (FIG. 6) shows a comparison between the two test series operated with a transonic rate of gas flow and the conventional melt-blowing process operated with the same number of melt orifices 15 per cm of die width. All of the average fibre diameters were measured by the same aerodynamic measuring method. The advantages of a transonic rate of gas flow, in particular for average fibre diameters of less than 3 μm are clearly evident.

As far as the physical properties of the fibre web products are concerned those produced by the process according to the invention are distinguished by a very low density and very soft handle. No adhesion of the fibres could be detected. Irrespective of the distance between the die and the fibre-collecting belt 9 virtually no flying fibres were detected even with very fine fibre diameters of <2 μm.

There has thus been shown and described a novel method and device for manufacturing ultrafine fibres from thermoplastic polymers which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A process for the production of microfibres and non-woven microfibre webs from thermoplastic polymers by the melt-blowing technique, in which the average diameter of the fibres are 0.2 μm to 15 μm, and in which a polymer melt is passed through at least one orifice in a melt-blowing die and is separated into fibres by a gas which impinges on the melt from both sides immediately after its exit from the orifice, said process comprising the steps of:
   a) conveying the gas through Laval nozzles arranged mirror-symmetrically in relation to the melt orifice and accelerating the gas in the Laval nozzles to supersonic speed;
   b) passing the gas through flow channels which are arranged downstream of the Laval nozzles and decelerating the gas flow from sonic speed to just below sonic speed in the flow channels, the flow channels having a convergent or substantially constant cross-section in the direction flow; and
   c) directing the polymer melt stream issuing from the orifice into the gas stream which is discharged from the flow channels.

2. The process according to claim 1, wherein the mean fibre diameters are 0.5 μm to 10 μm.

3. A device for the production of microfibres and non-woven microfibre webs from thermoplastic polymers by the melt-blowing technique, in which the mean fibre diameters are 0.2 μm to 15 μm and in which a polymer melt flows through at least one orifice in a melt-blowing die and is separated into fibres by a gas which impinges on the melt from both sides immediately after its exit from the orifices, said device comprising a melt-blowing nozzle with gas supply elements on both sides and gas nozzles directed towards the melt orifice, the improvement wherein the gas nozzles are designed in the form of Laval nozzles with flow channels arranged downstream thereof which have a convergent or substantially constant cross-section, and which are arranged in direct proximity to the wedge-shaped die tip and terminate with a sharp edge at most 3 mm above or below the level of the melt orifice.

4. A device according to claim 3, wherein the Laval nozzles (30, 31) have a slot-shaped cross-section.

5. A device according to claim 3, wherein the Laval nozzles (25, 26) each consist of a Laval opening (25) of an orifice diameter of 0.3 to 2 mm.

6. A device according to claim 4, wherein widened sections (26,32) which lead into the flow channel (27) are arranged downstream of the Laval nozzles (25, 26 or 31,32) and in that the inlet cross-section of the flow channel (27) is 1.0 to 2.5 times the sum of the widened cross-sections of the Laval nozzles, the outlet cross-section is 0.3 to 2.5 times this sum and the length of the flow channel (27) is 1 to 30 times the widened cross-section.

7. A device according to claim 3, wherein a gas smoothing chamber (23) is arranged upstream of several linearly arranged Laval orifices (25, 26) or of one slot-shaped Laval nozzle (30, 31) and the Laval nozzles (25, 26 or 30, 31) together with corresponding gas smoothing chamber (23) are integrated in the form of individual units to form a modular gas supply element (33a to 33d).

8. A device according to claim 7, wherein the gas supply elements (33a...33d) the width of which is 25 mm to 500 mm, are arranged in a gas-tight manner next to each other and to the melt-blowing nozzle (18).

9. A device according to claim 8, wherein the gas supply elements (33a...33d) are displaceable parallel to the wedge-shaped contour of the melt die tip (21), to allow the adjustment of the distance between the Laval nozzles (25, 26 or 31, 32) and the melt orifices (15).

10. A device according to claim 8, wherein the gas supply elements (33a...33d) have a width of 50 mm to 200 mm.

11. A device according to claim 3, wherein the mean fiber diameters are 0.5 μm to 10 μm.

* * * * *